US011579458B2

(12) United States Patent
Skeren et al.

(10) Patent No.: US 11,579,458 B2
(45) Date of Patent: Feb. 14, 2023

(54) LUMINAIRES AND OPTICAL ELEMENTS FOR USE THEREIN

(71) Applicant: IQ STRUCTURES S.R.O., Husinec-Rez (CZ)

(72) Inventors: Marek Skeren, Nova Ves I (CZ); Zbynek Ryzi, Littleton, MA (US); Tomas Tethal, Husinec-Rez (CZ)

(*) Notice: Subject to any disclaimer, the term of this patent is extended or adjusted under 35 U.S.C. 154(b) by 0 days.

(21) Appl. No.: 17/251,338

(22) PCT Filed: Jun. 13, 2019

(86) PCT No.: PCT/EP2019/065495
§ 371 (c)(1),
(2) Date: Dec. 11, 2020

(87) PCT Pub. No.: WO2019/238822
PCT Pub. Date: Dec. 19, 2019

(65) Prior Publication Data
US 2021/0255472 A1 Aug. 19, 2021

(30) Foreign Application Priority Data
Jun. 15, 2018 (GB) .................................... 1809899

(51) Int. Cl.
*G02B 27/42* (2006.01)
*B29D 11/00* (2006.01)
(Continued)

(52) U.S. Cl.
CPC ...... *G02B 27/425* (2013.01); *B29D 11/00278* (2013.01); *B29D 11/00769* (2013.01);
(Continued)

(58) Field of Classification Search
CPC .............. G02B 27/425; G02B 27/4277; G02B 19/0061; G02B 27/4272; G02B 5/1814;
(Continued)

(56) References Cited

U.S. PATENT DOCUMENTS 6,259,551 B1  7/2001 George et al.
6,259,561 B1 *  7/2001 George ................ G02B 27/425
                                              359/569
(Continued)

FOREIGN PATENT DOCUMENTS

DE   10 2015216111   3/2017
EP   1 577 608       9/2005
(Continued)

OTHER PUBLICATIONS

Cornelissen et al: "Diffraction gratings for lighting applications," Proceedings of SPIE, vol. 8835 (Sep. 30, 2018).
(Continued)

*Primary Examiner* — Bao Q Truong
(74) *Attorney, Agent, or Firm* — Walters & Wasylyna LLC

(57) ABSTRACT

A luminaire including: at least one light source (2), and an optical system (10, 11, 12a, 12b) for directing and/or distributing the light (5) emitted by the source(s) (2) into a desired output light distribution pattern (7); wherein the optical system comprises one or more optical elements (10, 11, 12a, 12b), the or each said optical element (10, 11, 12a, 12b) comprising a thin foil or sheet substrate having at least one optically functional surface or surface layer thereon or on a portion thereof, and wherein: (i) at least a portion of the at least one optically functional surface or surface layer on the substrate of at least one of the one or more optical elements (10, 11, 12a, 12b) has an at least partially diffractive optical function, and/or (ii) at least a portion of the at least one of the one or more optical elements (10, 11, 12a, 12b) is shaped such that its substrate is configured so as to have a non-flat or non-planar shape in three dimensions.

22 Claims, 5 Drawing Sheets

(51) Int. Cl.
*F21V 5/00* (2018.01)
*F21V 13/04* (2006.01)

(52) U.S. Cl.
CPC .............. *F21V 5/005* (2013.01); *F21V 13/04* (2013.01); *G02B 27/4277* (2013.01)

(58) Field of Classification Search
CPC ............ G02B 5/1847; B29D 11/00278; B29D 11/00769; F21V 5/005; F21V 13/04; F21V 5/008; F21V 13/12
See application file for complete search history.

(56) References Cited

U.S. PATENT DOCUMENTS

| | | |
|---|---|---|
| 2010/0214797 A1 | 8/2010 | Wang et al. |
| 2010/0322060 A1 | 12/2010 | Yasui |
| 2013/0194822 A1 | 8/2013 | Aikawa et al. |
| 2013/0314757 A1 | 11/2013 | Ser et al. |
| 2014/0043850 A1 | 2/2014 | Thompson et al. |
| 2015/0070901 A1* | 3/2015 | Rich ........................ F21K 9/233 362/335 |
| 2016/0341951 A1 | 11/2016 | Tearney et al. |
| 2018/0010770 A1 | 1/2018 | Bao et al. |
| 2018/0120555 A1* | 5/2018 | Ikuta ..................... A61B 1/0638 |

FOREIGN PATENT DOCUMENTS

| | | |
|---|---|---|
| GB | 2417790 | 3/2006 |
| GB | 2524549 | 9/2015 |
| JP | 2012-104256 | 5/2012 |
| WO | WO 2017/125322 | 7/2017 |

OTHER PUBLICATIONS

International Searching Authority: International Search Report and Written Opinion, Int. App. No. PCT/EP2019/065495 (dated Jan. 8, 2020).

Intellectual Property Office, Search Report, App. No. GB1809899.6 (dated Dec. 2, 2018).

* cited by examiner

LUMINAIRES AND OPTICAL ELEMENTS FOR USE THEREIN

This application is a U.S. national phase application of Intl. App. No. PCT/EP2019/065495 filed on Jun. 13, 2019, which claims priority from GB1809899.6 filed on Jun. 15, 2018. The entire contents of PCT/EP2019/065495 and GB1809899.6 are incorporated herein by reference.

TECHNICAL FIELD

This invention relates to luminaires, and in particular to optical elements for use in luminaires. More particularly, though not exclusively, the invention relates to optical systems for use in luminaires which comprise certain novel optical elements in this context. The invention also relates to methods for producing such optical elements for use in luminaires.

BACKGROUND AND PRIOR ART

As used herein, the term "luminaire" refers to and means an apparatus or device for emitting light in a particular desired distribution pattern, comprising at least one light source and an optical system whose construction, configuration and properties are such as to direct and/or distribute the light emitted by the source(s) into the desired output distribution pattern.

In many conventional designs of luminaire for use in the lighting industry, the optical systems used to distribute the light from the one or more light sources into the desired output distribution pattern have generally employed one or more optical elements, often an arrangement of optical sub-elements, relying on conventional reflective and/or transmissive optical properties to effect the desired light distribution and overall light output characteristics. In more recent times, however, the use of one or more optical elements based in micro-structured (e.g. micro-prismatic) optically functional surfaces has become more common, especially since such more advanced optically functional elements can be designed to deliver better flexibility and efficiency in tailoring specific light outputs and distribution patterns to suit individual needs.

However, such known optical elements used in known luminaires, by their very physical nature, use relatively large amounts of material in their construction, which leads to poor economy of manufacture on an industrial scale. It also tends to increase the weight and bulk of the optical systems used in such luminaires. Moreover, in the case of such known optical elements which are based on light transmission, their typically large thicknesses lead to high absorption losses, which decreases their lighting efficiency. Furthermore, the use of such known optical elements in luminaires places increasingly disadvantageous limitations on the ability of luminaire designers and manufacturers to come up with luminaire designs that offer more efficient use of space within a given luminaire housing, and it also limits the versatility in being able to create diverse specific or optimised light outputs and distribution patterns that certain specific lighting applications may require.

Indeed, in the known art of luminaires, there are already available a large number of particular luminaire solutions for achieving various desired illumination applications. For instance, in the past decade conventional incandescent or fluorescent light sources have been increasingly replaced by LED light sources. Compared with conventional light sources, such LEDs are typically much smaller (unless clustered into especially large arrays or areas). This has tended to lead luminaire designers to adopt luminaires with much smaller or compact overall sizes, not only so as to give such luminaires a new and fresh appearance from an aesthetic point of view, but also to reduce the amount of material from which the luminaires are made.

Nevertheless, such "miniaturization" of luminaires poses new problems for designers of luminaires' optical systems. Naturally, many manufacturers resort to obvious ways of miniaturizing the conventional optical elements themselves that are used in known luminaires, such as by the use of conventional lenses, structured diffusers, reflectors, and suchlike. However, scaling down such conventional optics in this way has its own limitations and drawbacks. For example, the output aperture/region of the optical system may become too small, with the result that the luminaire brightness becomes unpleasant to the user. Also, the optical power which is often tied to the thickness of the optical element itself may then have to grow, which creates new challenges.

Thus, to find an optimum compromise between the size and height of any luminaire's optical system may therefore be difficult, or even impossible, and it may require replacing the conventional optics of a known luminaire optical system with an alternative optical element which has a larger output aperture/region and/or which has a lower volume, yet has sufficient optical power or other optimised required optical properties. However, this then tends to lead to new problems and shortcomings. In particular, it then becomes difficult to achieve more sophisticated optical functions when such are needed.

The known use of a collecting element such as a reflector—e.g. made from metal (typically by machining or shaping) or plastics (typically made by injection molding)—may go some way to ameliorating the above latter shortcoming, but such known reflectors are often expensive and of limited efficacy. They may also typically be undesirably heavy and bulky.

It is therefore a primary object of the present invention to address and ameliorate these shortcomings and limitations in the known art.

SUMMARY OF THE INVENTION

Accordingly, in a first aspect of the present invention there is provided a luminaire including:
  at least one light source, and
  an optical system for directing and/or distributing the light emitted by the source(s) into a desired output light distribution pattern;
  wherein the optical system comprises one or more optical elements, the or each said optical element comprising a foil or sheet substrate having at least one optically functional surface or surface layer thereon or on a portion thereof,
  and wherein:
  (i) at least a portion of the at least one optically functional surface or surface layer on the substrate of at least one of the one or more optical elements has an at least partially diffractive optical function, and/or
  (ii) at least a portion of the at least one of the one or more optical elements is shaped such that its substrate is configured so as to have a non-flat or non-planar shape in three dimensions.

In some embodiments of the luminaire of the above-defined first aspect, the above-defined features (i) and (ii) may both be present together in any single one or more of the optical elements.

In some embodiments of the luminaire of the above-defined first aspect, the optical system may comprise a plurality of, i.e. at least two or more than two, optical elements. Thus, in such embodiments the optical system may comprise a plurality of optical elements, the or each said optical element comprising a foil or sheet substrate having at least one optically functional surface or surface layer thereon or on a portion thereof, and wherein:
(i) at least a portion of the at least one optically functional surface or surface layer on the substrate of at least one of the optical elements has an at least partially diffractive optical function, and/or
(ii) at least a portion of the at least one of the optical elements is shaped such that its substrate is configured so as to have a non-flat or non-planar shape in three dimensions.

In some such embodiments of the luminaire of the above-defined first aspect, including those embodiments with single or plural optical elements, the at least one optical element which is configured so as to have the non-flat or non-planar shape in three dimensions may be the same one(s) of the optical element(s) whose substrate's optically functional surface(s) or surface layer(s) has/have the at least partially diffractive optical function.

Alternatively, in some other such embodiments of the luminaire of the above-defined first aspect, including those embodiments with single or plural optical elements, the at least one optical element which is configured so as to have the non-flat or non-planar shape in three dimensions may be different one(s) of the optical element(s) whose substrate's optically functional surface(s) or surface layer(s) has/have the at least partially diffractive optical function.

In some embodiments of the luminaire of the above-defined first aspect, the optical system thereof may exclude any optical element which is other than the said one or more optical elements whose features are as defined in the preceding paragraphs defining the first aspect of the invention.

It is to be recognised that in certain embodiments of the luminaire of the invention, the construction or configuration of the one more optical elements may be new per se, not just through its/their use in a luminaire. Thus, according to a second aspect of the present invention there is provided an optical element per se for use in, or when used in, a luminaire according to the first aspect of the invention or any embodiment thereof, that optical element per se being an optical element as defined or described anywhere in this specification.

Accordingly, in embodiments of the above second aspect of the invention, there may be provided an optical element, especially an optical element for use in a luminaire, the optical element comprising a foil or sheet substrate having at least one optically functional surface or surface layer thereon or on a portion thereof, wherein:
(i) at least a portion of the at least one optically functional surface or surface layer on the substrate of the optical element has an at least partially diffractive optical function, and
(ii) at least a portion of the optical element is shaped such that its substrate is configured so as to have a non-flat or non-planar shape in three dimensions.

Likewise, it is also to be recognised that in certain embodiments of the luminaire of the invention, the construction or configuration of the overall optical system may be new per se, not just through its employment in a luminaire. Thus, according to a third aspect of the present invention there is provided an optical system per se for use in, or when used in, a luminaire according to the first aspect of the invention or any embodiment thereof, that optical system per se being an optical system as defined or described anywhere in this specification.

Accordingly, in embodiments of the above third aspect of the invention, there may be provided an optical system, especially an optical system for use in a luminaire, the optical system comprising:
one or more optical elements, the or each said optical element comprising a foil or sheet substrate having at least one optically functional surface or surface layer thereon or on a portion thereof, wherein:
(i) at least a portion of the at least one optically functional surface or surface layer on the substrate of at least one of the one or more optical elements has an at least partially diffractive optical function, and/or
(ii) at least a portion of the at least one of the one or more optical elements is shaped such that its substrate is configured so as to have a non-flat or non-planar shape in three dimensions.

In many embodiments of the invention, the or each optically functional surface or surface layer (or portion thereof) on the substrate of the at least one optical element may comprise an at least partially diffractive optical function, which may encompass both a fully or a partially diffractive optical function. That diffractive optical function may be derived from, or created by, a diffractive optical relief structure or pattern formed on the said surface or surface layer.

In some such embodiments the width and/or height of individual surface relief features of the relief structure/pattern may each be of the order of from about 0.001 up to about 100 μm, optionally from about 0.001 up to about 70 or 80 or 90 μm, further optionally from about 0.001 up to about 50 or 60 or 70 μm, even further optionally from about 0.001 or 0.005 or 0.01 up to about 5 or 10 or 20 or 30 or 40 or 50 μm.

More particularly, in some such embodiments the individual relief features may typically have depths of less than about 15 μm, optionally less than about 10 μm, further optionally less than about 5 μm, even further optionally less than about 3 μm. Alternatively or additionally, in some such embodiments the aspect ratio (i.e. the ratio of the relief profile depth to the relief feature size/width) of individual relief features may typically be less than about 1.

Thus, in many practical embodiment scenarios, that diffractive optical relief structure/pattern may be termed—as the term is used and understood in the art—as comprising a "nano- or micro-structured" relief structure/pattern. This can be contrasted with typically larger-sized relief features characteristic of other—and typically non-diffractive—optical functions of elements of known optical systems used in known luminaires and which are also often somewhat loosely called "micro-structures".

Alternatively or additionally, in some such embodiments the density of surface relief features of the relief structure/pattern may be defined and described in terms of periodicity or spatial frequency. These relief features may be arranged or distributed across a certain surface area in periodic or quasi-periodic groups or even random groups. The density of their placement across such an area may then be defined and described in terms of characteristic spatial frequency or frequency band. Typical values of such frequencies (in one or any surface direction) may for example be from about 50,000 or 20,000 up to about 20 or 50 features per mm.

In some embodiments of the invention the or each optically functional surface or surface layer (or portion thereof) on the substrate of the at least one optical element may comprise one or more smoothing features added to the diffractive structure/pattern thereof. Some specific examples of such smoothing features will be mentioned and discussed further hereinbelow.

In some embodiments of the invention the one or more optical elements, or at least a portion thereof, may each be independently shaped such that its (or its substrate's) general non-flat or non-planar shape extends in three orthogonal dimensions, especially so that its general shape is curved or arcuate in cross-section or profile, or follows a (e.g. simple or complex) mathematical function, in at least one, optionally in at least two, further optionally in three, directions or dimensions. Its shape or contour may be symmetrical or asymmetrical.

By way of some examples, the shape of the optical element (or its substrate) may be e.g. arcuate or curved in 2 or 3 dimensions, cylindrical (or part-cylindrical), spherical (or part-spherical), hyperpolic, parabolic, or it may be defined by any 2-dimensional or 3-dimensional mathematical functional, simple or complex, or it may be defined as a free-form optical surface. It may even have a shape derived from any combination of any of the aforesaid shapes or functions. Its curved or contoured shape may extend over at least a portion of the or the respective element, and especially it may extend either over substantially the whole of the element or just over a portion of it. In the case of plural optical elements being used in a given optical system, each optical element may have its shape selected or designed independently of the shape or design of any other one(s) of the optical elements present therein.

In some embodiments of the invention the non-flat and/or non-planar shaped substrate may be, or form a portion of, a reflector. In some such embodiments the reflector may be configured such that it directs and/or (re-)distributes light emitted by the light source(s) into emission angles of from about 45 degrees and above.

In some embodiments of the invention the—or at least a portion of—the or at least one of the optically functional surfaces or surface layers on the substrate of the or at least one of the one or more optical element(s) may have formed thereon or applied thereto one or more coating layers, the or each said coating layer being constructed or configured or formed of a material so as to modify, or further modify, the direction of light passing therethrough or to modify the light transmission and/or reflection properties of the at least one optically functional surface or surface layer on or to which the coating layer is formed or applied.

It is to be understood that any of various methods which may be used to form an optical element used in the invention, in which the substrate (or portion thereof) of the at least one optical element is configured so as to have the non-flat or non-planar shape in three dimensions, may be unique and new in the context of the production of such optical elements for use in luminaires.

Thus, according to a fourth aspect of the present invention there is provided a method for producing an optical element, the optical element comprising:
 a foil or sheet substrate having at least one optically functional surface or surface layer thereon or on a portion thereof, and wherein:
 (i) at least a portion of the at least one optically functional surface or surface layer on the substrate has an at least partially diffractive optical function, and
 (ii) at least a portion of the optical element is shaped such that its substrate is configured so as to have a non-flat or non-planar shape in three dimensions;
wherein the method comprises the steps of:
 (1) providing a foil or sheet substrate;
 (2) forming on or applying to at least one surface or surface layer of the substrate an at least partially diffractive optical relief pattern, whereby the said at least one surface or surface layer becomes the said at least one optically functional surface or surface layer with the said at least partially diffractive optical function; and
 (3) shaping the said substrate so that it assumes or is configured into the said non-flat or non-planar shape in three dimensions.

In embodiments of the above-defined production method, the shaping step (3) may be carried out either before or after the optical functionalisation step (2). Conversely, the optical functionalisation step (2) may be carried out either before or after the shaping step (3). Alternatively, in certain embodiments the optical functionalisation step (2) and the shaping step (3) may be carried out together or substantially simultaneously, e.g. in a single operation.

In some such, or even in other, embodiments of the above-defined production method, the method may include an additional step of:
 (4) forming on or applying to the at least one optically functional surface or surface layer one or more coating layers, the or each said coating layer being constructed or configured or formed of a material so as to modify the direction of light passing therethrough or to modify the light transmission and/or reflection properties of the at least one optically functional surface on or to which the coating layer is formed or applied.

The above step (4) may be carried out either before or after the optical functionalisation step (2). Alternatively or additionally, the above step (4) may be carried out either before or after the shaping step (3).

Furthermore, according to a fifth aspect of the present invention there is provided a method of making a luminaire, the method comprising:
 (1) making one or more optical elements independently by the method of the fourth aspect of the invention or any embodiment thereof; and
 (2) assembling and/or configuring or arranging the said one or more optical elements, optionally together with one or more additional or secondary optical elements, into an optical system; and
 (3) assembling and/or configuring the said optical system together with at least one light source into the said luminaire, optionally within an external housing.

In some embodiments of the invention, a potentially significant and useful feature thereof may be that they employ nano- or micro-structures which have a much higher density of optical features than conventional structures (even though they might be termed "micro-structures") used in optical systems of known luminaires. Higher density optical structures are usually thought of as bringing two negative effects to the overall optics function, in particular for white light, namely: colour aberration, and higher scatter (generated on transitions between individual features). However, and counter-intuitively to conventional wisdom in the art, we exploit these effects for a new and useful purpose in practising embodiments of the present invention, in that they may help produce new and desirable effects in forming the light output distribution patterns. Also, higher density nano- or micro-structures may enable us to design more complex optical functions.

Furthermore, in certain embodiments the combining of plural foils or sheets as plural substrates (as discussed further below) and high density nano- or micro-structures may enable the production of optics with especially complex optical functions within an unusually and advantageously small volume of material—especially in the context of luminaires that may be required to have particularly low profiles—which is impossible to achieve using known luminaire production technology.

In embodiments of the invention, although the optical function of the at least one optically functional surface or surface layer on the substrate of the at least one optical element has been defined as being at least partially diffractive, it is to be understood that within this definition it is intended to include optical functions that are alternatively or additionally at least partially refractive.

In embodiments of the invention the foil or sheet substrate of the or each optical element may have a general overall thickness (or a maximum or minimum or average thickness if the height of any optical relief pattern on one or more surfaces thereof is taken into account in that calculation) of less than about 1000 μm, especially less than about 500 μm, optionally less than about 250 μm or 125 μm, or possibly even less than about 50 μm or perhaps even as thin as around 15 μm. In typical such embodiments, therefore, suitable thicknesses of either foils or sheet substrates may be in the approximate range of from about 1 or 5 up to about 500 or 1000 μm, optionally from about 5 up to about 200 or 300 or 400 or 500 μm, further optionally from about 5 up to about 10 or 20 or 30 or 40 or 50 or 60 or 70 or 80 or 90 or 100 or 150 or 200 μm. Such extremely low demand on the material volume used for such foil or sheet substrates may reduce overall production costs dramatically, especially when practiced on an industrially replicated scale.

In some such embodiments the foil or sheet substrate of the or each optical element may have thicknesses which are at least about 10 times or 20 times or 50 times less than their smaller lateral dimension.

Thus, in many practical embodiment scenarios, that foil or sheet substrate may be termed—as the term is used and understood in the art—as being a "thin layer" substrate. This can be contrasted with typically larger (i.e. "thick") substrate or element thicknesses characteristic of the larger-scale optics of known optical devices or elements used in the optical systems of known luminaires.

In some embodiments of the invention the foil or sheet substrate of the or each optical element may be of a substantially uniform or constant thickness. This feature may help to ensure that the optical function exhibited by the surface or surface layer on the substrate is substantially uniform thereacross. It may also assist in maximising the collection and redistribution of light emitted by the light source(s) emitted therefrom at relative high emission angles.

In embodiments of the invention the foil or sheet substrate may be composed of any suitable material(s), and may take the form of a single-layer or a plural-layer foil or sheet or film. Suitable materials for the foil or sheet substrate, or for any individual layer therein, may include various plastics or polymeric materials, e.g. polycarbonate, polymethyl methacrylate, polyester, polyethylene terephthalate, polyethylene, as well as various others. Optionally, one or more layers of the foil or sheet substrate, or the substrate itself, may be formed from one or more metals or metal alloys, e.g. aluminium, steel, copper, brass, etc, or possibly even one or more ceramics, or any combination of any of the aforesaid materials. Commercially available practical examples of each of the above-listed materials are widely available and well-known to persons skilled in the art.

In some such embodiments of the invention the foil or sheet substrate may comprise or consist of an optically transparent material or combination of materials, especially an optically transparent plastics material or material combination.

In some embodiments of the invention the at least one optically functional surface or surface layer on the substrate (or portion thereof) of the or the at least one optical element may comprise an at least partially diffractive optical structure which operates at plural (or multiple) diffraction orders, especially at plural (or multiple) diffraction orders lower than $10^{th}$ or $15^{th}$ or $20^{th}$. Examples of such features and embodiments of the invention including same will be discussed and described in detail further below.

In some such embodiments of the invention the at least partially diffractive optical function of the at least one optically functional surface or surface layer on the substrate (or portion thereof) of the or the at least one optical element may be such that it operates at at least two or at least three or at least four diffraction orders having diffraction efficiency maximized at at least two or at least three or at least four wavelengths respectively.

In some embodiments of the invention the structure and/or configuration of the or the at least one optical element may be such that light emitted by the light source(s) of at least two different wavelengths which is incident on the said at least partially diffractive optical structure at the same angle of incidence is directed or (re-)distributed by the said optical structure into substantially overlapping directions with maximized diffraction efficiency, relative to the diffraction efficiency of light being directed or (re-)distributed into other directions (which may in certain cases be considered as optical noise).

In some embodiments of the invention the at least partially diffractive optical function of the at least one optically functional surface or surface layer on the substrate (or portion thereof) of the or the at least one optical element may be such that plural (or multiple) wavelengths of light with maximized diffraction efficiency are distributed across at least about 60% of the bandwidth of the light emitted by the light source(s).

In some embodiments of the invention the optically functional surface or surface layer of the or the at least one optical element may comprise a substantially reflective surface or surface layer. In some such embodiments the reflective surface or surface layer may comprise a metal film coating or layer, especially a thin metal film coating or layer, e.g. of Al, Au, Ag, Cr, Mo, etc.

Such reflective surface or surface layer materials may if desired comprise one or more dielectric materials, e.g. SiO, $SiO_2$, $Ta_2O_5$, $TiO_2$, $MgF_2$, etc. Such reflective surface(s) or surface layer(s) may comprise a single such layer or may instead comprise plural such layers, in a multi-layer arrangement. Further, in some cases such reflective surface(s) or surface layer(s) may comprise a combination of at least one thin film metal coating or layer together with at least one dielectric metal (or other) coating or layer.

In other such embodiments, the optically functional surface or surface layer of the or the at least one optical element may comprise, in order to function in effect as a reflective surface or surface layer, a TIR (total internal reflection) surface or surface layer.

In certain other embodiments of the invention the optically functional surface or surface layer of the or the at least one optical element may comprise a substantially optically transparent surface or surface layer.

In some embodiments of the invention the at least one optically functional surface or surface layer on the substrate (or portion thereof) of the or the at least one optical element may comprise an at least partially diffractive optical structure which comprises:

one or more structural features having a first density superimposed on one or more structural features with a second density, the first density being higher, especially significantly higher, than the second density, wherein the relatively higher density structural features have a size (especially a width and/or height) which is at least two times or five times or ten times smaller than the corresponding size of the relatively lower density structural features.

In some embodiments of the invention, instead of the diffractively optically functional substrate surface or surface layer of the at least one optical element being derived from or composed substantially of just one single such substrate foil or sheet or surface or surface layer thereof, in certain embodiments of the invention such an optical element may comprise a stack or superimposed or overlapping combination of a plurality of discrete such substrate foils or sheets or surfaces or surfaces layers.

In particular, in some such embodiments a nano- or micro-structured substrate or surface or surface layer thereof performing a given optical function may in effect be replaced by two or more layers (i.e. substrates or surfaces or surface layers thereof) forming a stack or superimposed or overlapping combination of layers, with each layer performing the overall optical function only partially, and the entire stack or combination of layers performing the overall optical function fully, as per the original nano- or micro-structured layer or its close equivalent.

In some such embodiments the nano- or micro-structures in the stack of layers may be designed such that their optical structure is substantially the same in all layers (although the degree of their partial optical function may not necessarily be the same in all layers).

In some such embodiments the optical functions associated with different portions of the original structure may be split into multiple layers of the stack in such a way that the respective portions of the structure in a given layer perform respective partial functions to different degrees for each portion, and in some cases this may be done differently for each layer in the stack.

In some such embodiments any separation between the layers in the stack may be such that the separation distance does not exceed the thickness of one or two of the layers in the stack. In certain ones of such embodiments a lateral shift between a beam incident on a given layer and the next one may be such that the lateral shift does not exceed the separation distance between neighbouring layers in the stack.

Some specific examples of such stacked layer arrangements will be discussed and described further hereinbelow, in conjunction with some illustrations of such example arrangements in the accompanying drawings.

In some embodiments of the invention the optical system of the luminaire may include, in addition to the said at least one optical element having the at least one optically functional surface or surface layer thereon, one or more secondary optical elements, wherein the one or more secondary optical elements may be of any type and function which further defines or distributes or modifies or redistributes the direction(s) of light from the light source(s) incident thereon and as such thereby contributes to the formation of the output light distribution pattern at the exit of the luminaire.

Examples of such secondary optical elements may include conventional or known lenses, reflectors, micro-structures, apertures, barriers, diffusers, etc., and may include micro-scale as well as TIR (total internal reflection-based) versions of such elements.

In some such embodiments, any such secondary optical element(s) which is/are included may serve an additional purpose of acting as or providing a support or base for carrying the one or more, or a respective one of the, primary optical elements of the invention, which in some cases may not be rigid or strong enough on its/their own to support themselves to a sufficient degree. In such instances it may for example be the case that such one or more secondary elements may comprise a substrate or base layer which is more rigid than, e.g. through being of a greater thickness than, the foil or sheet substrate of the primary optical elements(s) of the invention.

In some such embodiments, any such secondary optical element(s) may be arranged either:

(a) separately or discretely within the luminaire and spaced apart from, and/or oriented parallel or non-parallel to, the at least one optical element according to the second aspect of the invention (or any embodiment thereof), or (b) superimposed on or overlapped with, or placed facially adjacent, the at least one optical element according to the second aspect of the invention (or any embodiment thereof).

Accordingly, in some practical example implementations of embodiments of various aspects of the invention, the following species of embodiment optical systems may be envisaged, among others. For example:

(1) An optical system for a luminaire (e.g. as shown in FIGS. 1(*a*) and 1(*b*) of the accompanying drawings and described in detail further below) may comprise:

a plurality of, e.g. two or more, optically-functional optical elements as defined within the first aspect of the invention, wherein:
(i) at least one of the said optically-functional optical elements is shaped so that its substrate is configured so as to have the non-flat or non-planar shape in three dimensions, optionally in three orthogonal dimensions,
optionally wherein at least one other of said optically-functional optical elements is substantially flat or planar in its general shape; and
(ii) at least one other of the said optically-functional optical elements comprises at least a portion of the at least one optically functional surface or surface layer on the substrate thereof having the at least partially diffractive optical function.

Thus, the above embodiment species (1) may be an example of an optical system in which the at least one optical element which is configured so as to have the non-flat or non-planar shape in three dimensions is a different one(s) of the optical element(s) whose substrate's optically functional surface(s) or surface layer(s) has/have the at least partially diffractive optical function.

In some example forms of the above embodiment species (1), the said at least one other diffractively-optically-functional optical element(s) (ii) may comprise a stack or paired combination of like diffractively-optically-functional optical element(s), especially e.g. a pair thereof which are inversely mutually superimposed, so that the stack or paired combination acts to further tailor the distribution or modification of the output direction(s) of light redirected from the said at least one non-flat or non-planar three-dimensionally shaped optically-functional optical elements (i).

(2) An optical system for a luminaire (e.g. as shown in FIG. 2 of the accompanying drawings and described in detail further below) may comprise:
- at least one optically-functional optical element as defined within the first aspect of the invention, wherein:
  - (i) the said at least one optically-functional optical element is both:
    - shaped so that its substrate is configured so as to have the non-flat or non-planar shape in three dimensions, optionally in three orthogonal dimensions, and
    - configured such that at least a portion of the at least one optically functional surface or surface layer on the substrate thereof has the at least partially diffractive optical function.

Thus, the above embodiment species (2) may be an example of an optical system in which the at least one optical element which is configured so as to have the non-flat or non-planar shape in three dimensions is the same one(s) of the optical element(s) whose substrate's optically functional surface(s) or surface layer(s) has/have the at least partially diffractive optical function.

In some example forms of the above embodiment species (2), the optical system may further comprise at least one secondary optical element having a secondary optical function for further distributing or modifying the direction(s) of light redirected from the said plurality of optically-functional optical elements (i).

(3) An optical system for a luminaire (e.g. as shown in FIG. 3 of the accompanying drawings and described in detail further below) may comprise:
- at least one optically-functional optical element as defined within the first aspect of the invention, wherein:
  - (i) at least one first portion or region of the said optically-functional optical element is shaped so that its substrate is configured so as to have the non-flat or non-planar shape in three dimensions, optionally in three orthogonal dimensions; and
  - (ii) at least one second portion or region of the said optically-functional optical element comprises at least a portion of the at least one optically functional surface or surface layer on the substrate thereof having the at least partially diffractive optical function;
- optionally wherein the said first and second portions or regions of the said optically-functional optical element are formed by discrete and different ones of plural portions of the said optically-functional optical element,
- further optionally wherein the said first and second portions or regions of the said optically-functional optical element are formed with their respective substrates at least partially in common with, or unitary with, one another.

Thus, the above embodiment species (3) may be another example of an optical system in which the at least one optical element which is configured so as to have the non-flat or non-planar shape in three dimensions is the same one(s) of the optical element(s) whose substrate's optically functional surface(s) or surface layer(s) has/have the at least partially diffractive optical function, but it may be considered to be a modified version thereof in which discrete, different ones of plural portions or regions thereof constitute respectively the at least one optical element which is configured so as to have the non-flat or non-planar shape in three dimensions and the at least one optical element whose substrate's optically functional surface(s) or surface layer(s) has/have the at least partially diffractive optical function.

In some example forms of the above embodiment species (3), the said at least one first portion or region being the non-flat or non-planar optically-functional optical element portion or region (i) of the at least one optical element may be configured such as to surround or enclose or circumscribe or peripherally contain the said at least one second portion or region being the diffractively-optically-functional optical element portion or region (ii).

Some specific example optical system arrangements corresponding to each of the above embodiment species will be described in further detail hereinbelow in conjunction with reference to the respective FIGS. of the accompanying drawings as indicated.

In some embodiments of the luminaire of the invention the at least one light source may comprise at least one polychromatic light source. An example of such a polychromatic light source may be a white light LED.

Thus, in practical embodiments of the invention, the at least one light source may comprise one or more LEDs (light emitting diodes), or even an array of a plurality of LEDs, e.g. powered from a suitable electrical power source. Alternatively, any other suitable, or even a conventional, form of light source may be used instead, e.g. one or more filament-based or halogen-based (or other gas-based) light sources.

Also in practical examples of luminaires according to embodiments of the invention, the one or more light source(s) and the one or more optical element(s) of the optical system (optionally together with any secondary optical element(s) present) may be housed within any suitable body, enclosure or housing, in accordance with well-known practices and knowledge in the art for the construction and production of luminaires of various kinds.

Embodiments of the present invention in its various aspects may be applied to a wide range of luminaires for a variety of end uses. Generally speaking, however, all the individual components of a given luminaire's optical system, and in some cases also the luminaire body itself (including any auxiliary or additional optical or non-optical elements or accessories), may be designed, arranged and assembled in such a way as to form a predetermined specific light distribution pattern at the luminaire output.

In accordance with the underlying essence of the present invention, the novel approach presented herein to the design of the optics of the optical system for a luminaire is based on the use of one or more optical elements having a substrate with a "thin layer" structure and form. These use significantly less material than conventional optical elements used in luminaires, and therefore significantly reduce materials costs. This also allows the relevant optical elements to be shaped, if desired, into a variety of three-dimension non-planar forms or shapes, in order to tailor the optics of the optical system to any desired specific characteristics, properties or functionality(ies). Yet because of the formation or application of the one or more optically functional surface(s) on the at least one surface of the thin layer substrate, this advantageously allows such optical elements to still be highly effective and efficient for distributing or creating particular desired light outputs or exiting light distributions from luminaires incorporating them.

Furthermore, in some embodiments in which transmission-type thin-layer substrates are used to form the relevant optical element(s), these may have a further advantage that absorption losses in the material of the optical element(s) may be reduced, thereby increasing their lighting efficiency, as compared to conventional optical elements of conventional luminaires which employ larger element thicknesses and thus higher material volumes.

In the context of many embodiments of this invention, a primary purpose of the nano- or micro-structuring of the surfaces of the thin layers and/or the shaping of the thin layers into three-dimensional configurations or three-dimensional configured elements, is to enable the redirecting of incident light by the layer's (or layers') optical surface(s), in order to transform all or a significant portion of the light emitted from the light source(s) (the latter being a part of the optical system) into a desired light distribution pattern at the output of the optical system. Apart from being able to redirect incident light, it may be desirable or useful in some embodiments for some or all the optical surface(s) to be coated with a single- or multi-layer thin film coating (e.g. of or including Al, Ag or Au, or a suitable anti-reflective coating material), or to be furnished with a nano-structure having antireflective properties (e.g. a moth-eye antireflective structure), in order to enhance or suppress surface reflectivity and/or to increase or suppress light transmission through the thin layer. Such a coating layer or film may be applied on structured or unstructured optical surfaces of optical elements used in embodiments of the invention.

In putting embodiments of the present invention into practical effect, the production of primary moulds for formation or production of the thin layer-based optical elements may be very effectively done for example by direct writing, using e.g. laser or e-beam writers, practical examples of which apparatuses are well-known in the art. Such techniques may also allow optimum shaping of any nanometre-scale relief profile features used for the optically functional surface, in order to increase the efficiency of the optical function of the as-produced originated optical element. Upon completion of the origination process, the optically functional structure may then typically be transferred into a mould, e.g. by UV casting or electroforming, which is then used for a replication procedure, for example by hot embossing or UV casting. Such techniques may prove very effective in low-cost and high-volume production methods, especially with the use of a roll-to-roll or roll-to-sheet type replication processes.

Although in the prior art the use of certain types of diffractive structures in luminaires may sometimes produce undesirable visual colour effects, such effects may be suppressed or ameliorated in the practising of embodiments of the present invention by appropriately designing and tailoring the overall optical characteristics of such structures when used in the optical elements of luminaires of embodiments of this invention, or by using them in an appropriate combination with other diffractive or non-diffractive optical elements, such as one or more of the above-defined secondary optical elements. A primary advantage of diffractive structures and partially diffractive (and/or at least partially refractive) structures, however, is in the versatility with which their optical function may be designed. Even very complex optical functions may be able to be achieved by specific distribution(s) of various optically functional feature(s) across the relevant optically functional surface(s) of the or the respective optical element. Since the typical feature size of such an optical structure in embodiments of the invention may be very small, as discussed above, it may be possible to fit especially or unusually large number(s) of such feature(s) forming a complex optically functional arrangement into a given unit area of the optically functional surface of such optical elements. Such highly complex structures performing complex optical functions cannot be easily achieved (if at all) by commonly used techniques used in the production of known optical systems for luminaires, such as injection moulding, diamond turning or micromachining. This may therefore make embodiments of the present invention especially attractive for the design of luminaires in which such highly complex structures are needed or desired.

As used herein, the term "light" is intended to be construed broadly as meaning any electromagnetic radiation in the visible region of the electromagnetic spectrum. The term may also be considered to include electromagnetic radiation in the near-visible regions of the spectrum, such as the near-infra-red and/or near-ultraviolet regions thereof.

Within the scope of this specification it is envisaged that the various aspects, embodiments, examples, features and alternatives, and in particular the individual constructional or operational features thereof, set out in the preceding paragraphs, in the claims and/or in the following description and accompanying drawings, may be taken independently or in any combination of any number of same. For example, individual features described in connection with one particular embodiment are applicable to all embodiments, unless expressly stated otherwise or such features are incompatible.

BRIEF DESCRIPTION OF THE DRAWINGS

Some embodiments of the invention in its various aspects, as well as various technical features underpin some of those embodiments, will now be described and explained in detail, by way of non-limiting example only, with reference to the accompanying drawings, in which:

FIG. 5(b) is another schematic cross-sectional illustration representing an example optical element based on stacked or layered combinations of plural optically functional elements, layers or surfaces, in which:

FIG. 5(b), top half, illustrates an optical function (deflection to higher angles) which cannot be performed by one prismatic structure of a given orientation, but can be performed by two stacked structures of the same type and orientation, each performing a portion of the deflection, and in total they perform the desired total deflection; and FIG. 5(b), bottom half, illustrates an optical function (deflection to higher angles) which cannot be performed with high efficiency by one blazed diffraction grating of a given orientation, but can be performed efficiently by two stacked gratings of the same type and orientation, each performing a portion of the deflection, and in total they perform the desired total deflection;

DETAILED DESCRIPTION OF EMBODIMENTS

Figure 1A:
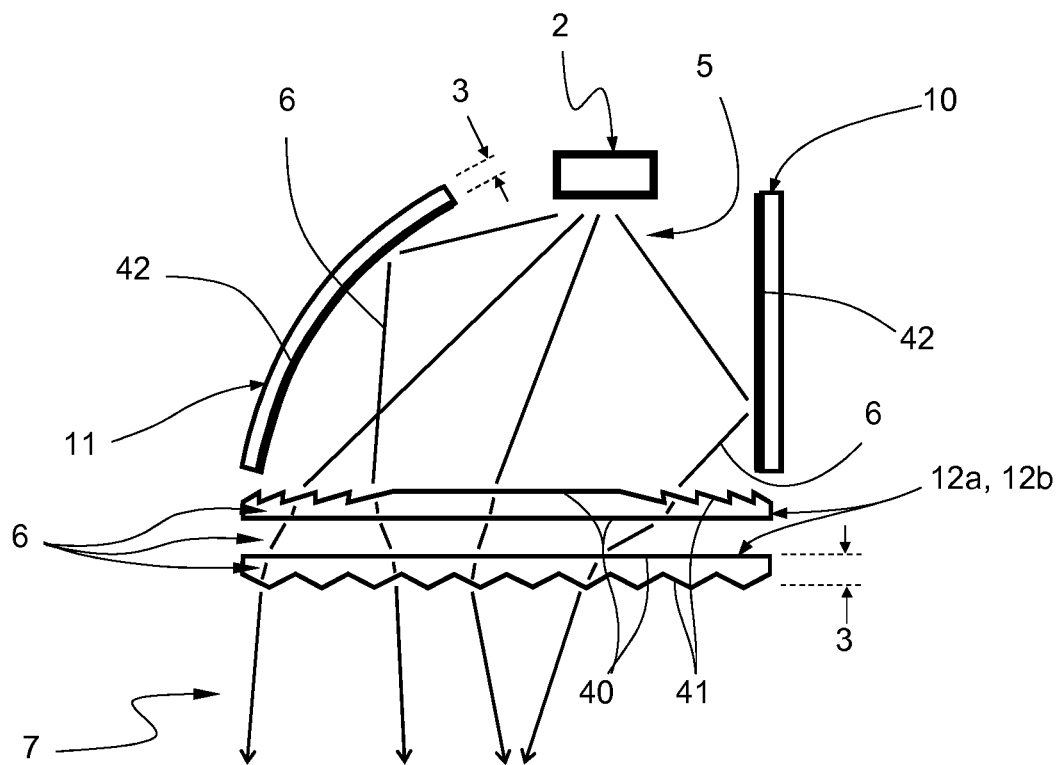
FIG. 1(a) is a schematic cross-sectional view of a luminaire optical arrangement according to a first embodiment of the invention.
Figure 1B:
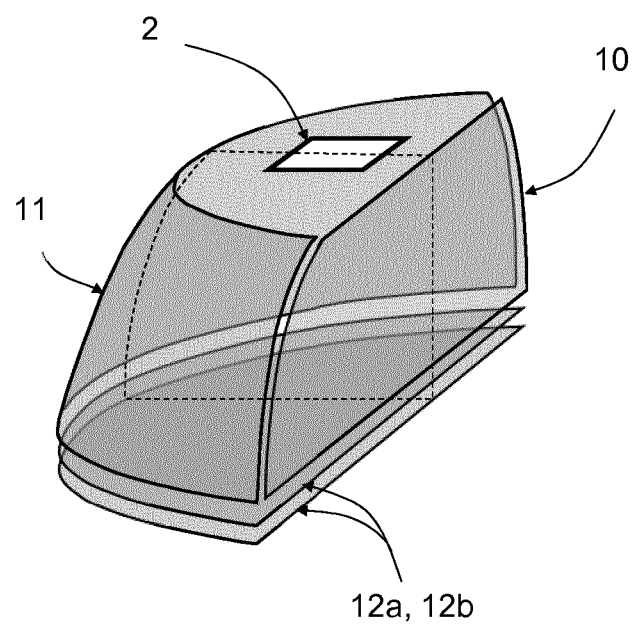
FIG. 1(b) is a schematic perspective view of the arrangement shown in FIG. 1(a)

FIGS. 1(a) and 1(b) show a luminaire optical system comprising plural—in this case four—optically functional optical elements 10, 11, 12a, 12b, and a light source 2, for example an LED. Each optical element 10, 11, 12a, 12b is in the form of a thin layer, e.g. a plastics foil, of a respective substantially uniform thickness 3, typically below about 500 µm (which thickness 3 may be substantially the same or may be different for each respective element layer 10, 11, 12a, 12b). Three of the layer elements 10, 12a, 12b are flat, while one element layer 11 is curved in three dimensions so as to represent a free-form three-dimensional optical element.

Each of the two flat layer elements oriented horizontally, 12a, 12b, comprises two optical surfaces 40, 41, one on each side of the respective foil substrate layer. The optical surfaces 41 are partially diffractive, and may also be partially refractive, optical surfaces, while the optical surfaces (or surface portions) 40 are not, e.g. they may be merely refractive. Each of the other two optical element layers 10, 11 comprises only one optical surface 42, and one non-optical surface on the opposite side of the respective element layer—i.e. they are not designed or arranged to process incident light.

The surfaces 40 on one respective side/face of the two flat horizontal layer elements 12a, 12b are just plain index boundaries, i.e. a flat boundary between the layer element surface and the surrounding environment, whilst the surfaces 41 on the respective opposite sides/faces thereof are nano- or micro-structured diffractive and/or refractive surfaces. The inner surfaces 42 on each of the two optical element layers 10, 11 are coated with a reflective thin film coating.

The light source 2 emits radiation 5 which is incident on the various optical surfaces present—i.e. 42, 41, 40—and these surfaces redirect the incident radiation by a combination of reflection, refraction and diffraction. The redirected radiation 6 propagates further in a sequence to other ones of the optical surfaces—in particular 40 and 41—until it finally exits the optical system forming a specific light output distribution pattern 7.

Thus, in more detail, in the optical system as illustrated in FIGS. 1(a) and 1(b), the following features may be recognised:
one or both sides of each layer optical element 10, 11, 12a, 12b comprises an optical surface;
at least a portion of each optical surface (of each optical element) is configured to receive at least a portion of radiation from the at least one radiation (e.g. light) source 2, or at least a portion of radiation 6 reflected from or transmitted through any of the other optical surfaces or optical elements in the optical system;
at least one of the optical surfaces of any of the layer optical elements 10, 11, 12a, 12b comprises:
a diffractive nano- or micro-structure 41 with characteristic feature sizes e.g. below 100s of µm or even below 10 s of µm, or
a thin film coating, or
both of the above;
the optical function of each optical surface is designed:
to redirect at least a portion of the incident radiation into a specific radiation distribution pattern, which:
propagates towards another optical surface or optical element 6, or
contributes to the predefined radiation distribution pattern 7 at the output of the optical system, or
both of the above;
and/or to modify reflection or transmission properties of the corresponding layer;
and/or to totally reflect at least a portion of the incident radiation;
and/or to effect any combination of the aforementioned optical functions;
all the optical elements in the optical system are designed and arranged to produce a predefined radiation (light) distribution pattern 7 at the output of the optical system.

Figure 2:
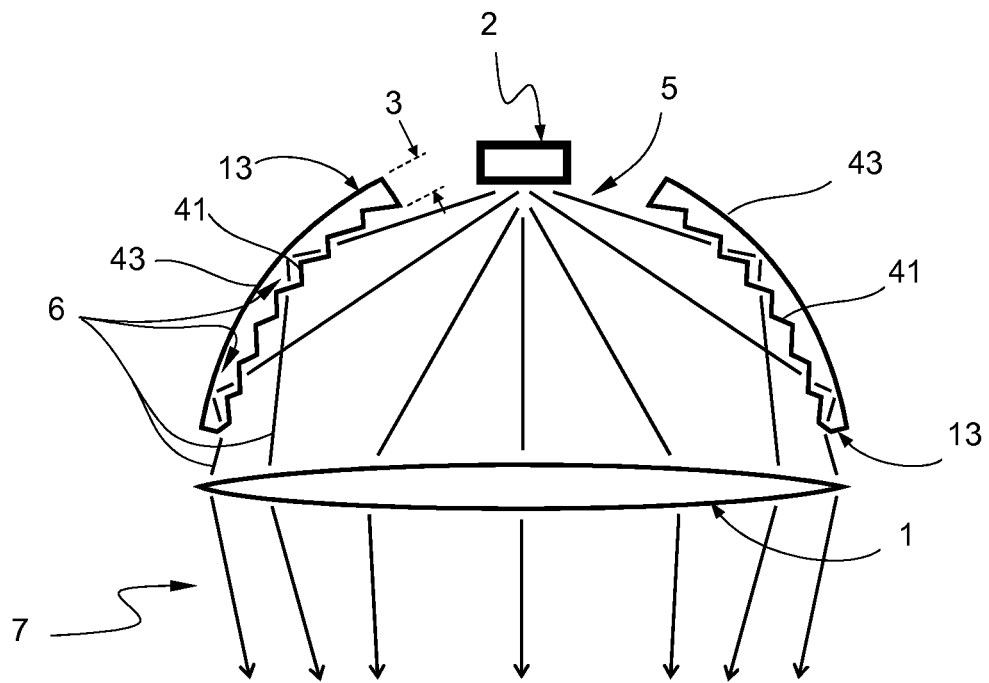
FIG. 2 is a schematic cross-sectional view of a rotationally symmetrical luminaire optical arrangement according to a second embodiment of the invention.

FIG. 2 shows in cross-section a luminaire optical system comprising a LED light source 2 and a rotationally symmetrical thin layer diffractive optical element 13 (shown in two halves on each side of the drawing, given that it is showing it in cross-section) shaped into a free-form three-dimensional optical element which extends in three dimensions around the luminaire. The optical system also includes a classical volume lens element 1. The thin layer partially diffractive element 13 has optical surfaces on both its sides. One surface comprises a partially diffractive nano- or micro-structure 41, e.g. moulded into the layer during the layer shaping process, and the other surface 43 is a simple curved index boundary with a TIR function.

The inner surface 41 of the element 13 receives a portion of light 5 from the source 2. The nano- or micro-structure features on this surface 41 are configured such as that they redirect incident light by diffraction (and/or also by refraction) into a light pattern 6 which is further redirected by surface 43 by total internal reflection and send the light back to the surface 41, which then redirects the light towards the lens element 1 which processes that portion of light—as well as a portion of the light 5 coming directly from the source—so as to create a final light distribution pattern 7 at the exit of the optical system.

All the optical elements in this optical system and the interactions between them are designed and configured such that all the radiation from the source 2 is transformed into a quasi-collimated beam.

Thus, in more detail, in the optical system as illustrated in FIG. 2, the following features may be recognised:
- the element 13 is shaped into a free-form three-dimensional optical element comprising a nano- or micro-structured surface 41, especially one which is at least partially diffractive;
- that shaping may be done using a foil moulding process, e.g. comprising a transfer of a nano- or micro-structured relief pattern on the mould surface, or a portion thereof, to create a nano- or micro-structured surface on the layer element 13;
- during that shaping of the element 13 the nano- or micro-structured surface 41 is configured so that, in use, it receives at least a portion of radiation from the radiation source(s) 2 or a portion of radiation 6 reflected from or transmitted by any of other layer surfaces or optical elements in the optical system,
- that shaping of the element 13 is done so that the resulting optical function of the surface 41 is designed to redirect at least a portion of the incident radiation into a specific radiation (light) distribution pattern, which:
  - propagates (e.g. as at 6) at least towards another optical surface or optical element of the system, and/or
  - contributes to the predefined radiation distribution pattern 7 at the output of the optical system;
- all the optical elements in the optical system are designed and arranged to produce a predefined radiation (light) distribution pattern 7 at the output of the system.

Figure 3:
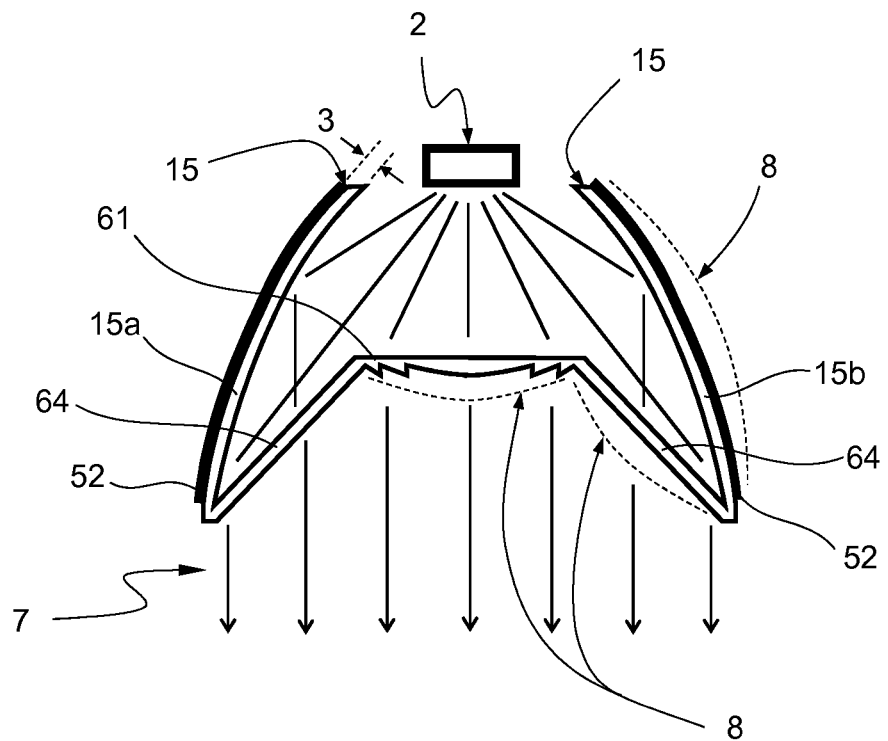
FIG. 3 is a schematic cross-sectional view of a luminaire optical arrangement according to a third embodiment of the invention.

FIG. 3 shows a modified embodiment of a luminaire optical system within the scope of the invention which has a multi-region (or plural-region) arrangement 8 based on a multi-functional surface of a unitary thin layer optical element 15.

In this case, however, the unitary thin layer element 15 is shaped overall into a rotationally symmetrical free-form three-dimensional optical element 15 (shown in two halves on each side of the drawing, given that it is showing it in cross-section). The outer curved or arcuate portions or regions 15a, 15b each comprise a reflective coating 52 which, together with the specifically designed shape of those element portions or regions 15a, 15b, collimate radiation from the source 2 emitted into higher angles. The central portion or region 61 of the element 15, located between the outer portions/regions 15a, 15b, comprises a zonal lens 61 which collimates the radiation from the source 2 emitted into smaller angles. The regions 64 between the reflecting and collimating regions represent plain index boundaries transmitting incident radiation without any substantial modification.

The specific configuration of this single layer multi-region element 15 transforms radiation from the source 2 into a collimated beam 7 at the output of the optical system.

Thus, in more detail, in the optical system as illustrated in FIG. 3, the following features may be recognised:
- single layer multi-region element 15 is curved or shaped into a free-form three-dimensional optical element using a foil molding process;
- as in the other illustrated embodiments discussed above, the thin substrate layer 15 is in the form of a plastics foil with a substantially uniform thickness 3 of about 500 µm or less;
- both sides of the each element portion 15a, 15b, 61 comprise an optical surface, in which:
  - each surface is configured to receive at least a portion of radiation from the radiation (light) source(s) 2 or at least a portion of radiation 6 reflected from or transmitted through any of the other surfaces or optical element portions in the optical system;
  - the optical function of each surface is designed to:
    - redirect at least a portion of the incident radiation into a specific radiation distribution pattern, which:
      - propagates towards another optical surface or element,
      - or contributes to the predefined radiation distribution pattern 7 at the output of the optical system,
      - or both of the above;
    - and/or modify the reflection and/or transmission properties of the corresponding layer/element;
    - and/or totally (e.g. internally) reflect at least a portion of the incident radiation;
    - and/or any combination of the above-listed optical functions;
- each optical surface of the element portions 15a, 15b, 61 comprises at least one of:
  - a nano- or micro-structure with a diffractive optical function,
  - a thin film coating,
  - both of the above;
- all the optical elements in the optical system are designed and arranged to produce a predefined radiation (light) distribution pattern 7 at the output of the system.

There now follows a detailed description of "nano- and micro-structures", which may provide the focus of many embodiments of the present invention, especially those which are based on diffractive structures, and further especially those which are based on diffractive structures with multi-order (or plural-order) functionality(ies).

During the process of modelling, simulating and experimenting with various types of nano- and micro-structures we came to a conclusion that production of nano- and/or micro-structures may be very efficiently accomplished in high volumes if these structures form an optical surface on thin plastic layers (e.g. foils) in the form of a relief structure, in particular if the relief features are relatively shallow (e.g. typically less than about 15 µm, especially less than about 10 µm, or perhaps less than about 5 µm, or even less than about 3 µm deep) and their aspect ratio (i.e. the ratio of the relief profile depth to the relief feature size/width) is preferably less than about 1. Such structures may be embossed into or UV casted onto very cheap plastic foils which may be used for example in security holography applications, which are very thin, typically less than about 50 µm and even as thin as about 15 µm. However, many other foils are readily available on the market and available in various thicknesses, typically less than about 500 µm, or 250 µm or 125 µm, and may be used in certain embodiments of this invention.

A particular useful type of nano- and/or micro-structure which fits the above description is, for example, a diffractive structure. They may be designed in very complex forms (e.g. high density of their nano- and/or micro-features, which may be arranged into very complex two- or three-dimensional patterns in the form of a surface and/or volume relief structure), which may enable them to generate complex light distribution patterns, whilst at the same time their high complexity does not make them more difficult to reproduce than less complex structures once the primary master structure (or mould) has been produced. This is often not the case with known "micro-prismatic" optics (i.e. optics with microstructured surfaces in the form of an array or assembly of a plurality of micro-prismatic or other refractive features) which are more widely used in luminaires nowadays, and which operate primarily on refractive optical principles rather than diffraction principles. The size and height of such known micro-prismatic features is also often much larger and deeper (e.g. 10s to 100s of µm) than features of a diffractive structure, and therefore their high volume production may be less effective.

The diffractive structures used in the present invention, in spite of their effective replicability, have hitherto not been considered as a useful solution for luminaire optics or more generally for white-light illumination applications, since they are often perceived as structures producing too strong chromatic aberration, which is an unwanted effect observed either in light distribution patterns or illumination patterns that they produce. For this reason, diffractive structures may, on the basis of conventional wisdom, be rather seen as a suitable choice for monochromatic or quasi-monochromatic applications (e.g. to process light emitted by a monochromatic LED or a laser).

To be able to use diffractive structures in white-light illumination applications, the effect of chromatic aberration usually needs to be suppressed. There are several ways of doing this. For example, the incident light may be blurred at the entrance or exit of the diffractive structure by some type of an additional diffuser which acts to spatially mix incident light or light processed by the diffractive structure and therefore also mix the propagation directions of various wavelengths. The degree of mixing may be tied to the degree of "achromatization". A drawback of this approach is, however, that the light distribution pattern also may become blurred (e.g. is widened and/or it loses its definition or sharp transitions). As a result, this approach may not allow (or it may suppress) realization of complex functions of the diffractive optics. Moreover it may require one or more additional or secondary optical element(s) (e.g. one or more diffusers), which unfortunately then adds cost to the overall optical system.

Another achromatization approach may be to use a technique of mixing the performance of a diffractive structure designed for several wavelengths (typically red, green and blue, in the case of white light) in such a way that the structure is divided into small portions (e.g. regions or pixels), and multiple sets of these regions—with each set being associated with a particular design wavelength—alternate (e.g. regularly, quasi-randomly or randomly) across the area of the diffractive structure. However, since the area of the diffractive structure may thus in effect practically split into three different structures, this may reduce the structure area's potential to realize more complex optical functions. Also, such an approach may be more suitable for applications using several distinct colours rather than a continuous spectrum typically produced for example by white light LEDs.

Following on from the foregoing discussion, we turn now to a more detailed explanation of the function of diffractive structures used in accordance with the present invention, especially those which are based on diffractive structures with multi-order (or plural-order) functionality(ies). However, it is to be understood that this explanation is for non-limiting explanatory purposes only for aiding an understanding of certain embodiments of the invention, so it should not be construed as limiting the scope of the invention to any particular theory or theoretical model or embodiment.

Yet another achromatization approach may be to operate diffractive elements simultaneously at multiple (or plural) diffraction orders. The use of such an approach is actually novel in the area of illumination applications, in particular if white light is involved. It is well-known that diffractive structures produce multiple orders (apart from zero order, and excluding cases when typical feature size of a diffractive structure is comparable or rather smaller than the wavelength of the incident light). There are applications of diffractive optics in which several of such orders generated by the diffractive structure perform a specific optical function. This may be the case in the use of diffractive elements called beam splitters. A diffraction structure of this kind may be designed such as to split an incident beam into three diffraction orders of the same diffraction efficiency and the proper proportions of the structure feature sizes ensure the efficiency is maximized. Such or similar diffractive beam splitters are usually designed for one wavelength, but the structure generates multiple diffraction orders which are intentionally and simultaneously used in a particular optical application. It is possible to say that such a structure "operates" simultaneously at multiple (or plural) diffraction orders. In many cases, the very same structure would produce more diffraction orders than "operational" ones. However, these orders are usually undesirable, since they often carry away (i.e. in non-useful directions) some portion of incident energy (i.e. decreasing the diffraction efficiency of the operational diffraction orders) and/or are perceived as optical noise, which may negatively interfere with the optical function of the system in which the diffractive beam-splitting element is used.

Another historically old type of diffractive element operating simultaneously at multiple (or plural) diffraction orders is an echelle grating used in spectroscopy applications. It is a relatively coarse grating (i.e. coarse with respect to wavelengths of the incident light) which can produce high numbers of diffraction orders, each of them generating a spectrum of wavelength (spatially separated) represented in the incident light and each of them having optimized (i.e. maximized) diffraction efficiency at one wavelength of the generated respective spectrum. If the incident light has the same angle of incidence for each wavelength these diffraction orders (i.e. diffraction spectra) overlap, which is an undesirable effect for spectroscopy purposes. Therefore, echelle gratings are usually combined with another optical element which pre-separates wavelengths into a range of angles of incidence, which helps to spatially separate spectra subsequently generated by multiple (or plural) diffraction orders of the echelle grating, which enables meaningful detection and/or spectral analysis.

The novel use of the simultaneous use of multiple diffraction orders (i.e. operational orders) in illumination applications can be demonstrated using the following example:

The basic function of the optics used in luminaires—which optics generally employ one or more optical elements—is to redirect light coming from one direction into one or more other directions. In general, different parts of the optical element deflect incoming light into different directions. In the case of diffractive structures, the deflection is realized typically by a periodic or quasi-periodic structure, of which the simplest representative structure is a diffraction grating, i.e. a structure with equi-distantly spaced linear features. For simplicity we will further consider a thin ("thin" meaning a theoretical construct in the field of diffractive optics) surface relief transmission grating with equi-distantly distributed linear features having a blazed (i.e. sawtooth-like) profile. The deflection angle on the diffraction grating is given by the grating equation:

$$\sin \theta_{dm} = \sin \theta_i + m(\lambda/\Lambda),$$

where $\theta_{dm}$ is the angle of diffraction (i.e. deflection) of m-th order, $\lambda$ is a wavelength in the spectral bandwith of the incident light, $\Lambda$ is the grating period (i.e. spacing of grating lines) and $\theta_i$ is the angle of incidence. Based on the principle of diffraction on a thin grating, the diffraction efficiency $\eta_m$ of the m-th order (i.e. the portion of incident light deflected into angle $\theta_{dm}$) is $$\eta_m = \mathrm{sinc}\ [m-d(n-1)/\lambda].$$

If the grating operates at the first order, the angle of incidence is 0 and the grating depth is tuned to maximize efficiency at green wavelength $\lambda_g$. The diffraction efficiency of green wavelength $\eta_{1g}$ will be equal to 1 (i.e. 100%), and all other wavelengths diffracted into $1^{st}$ order will have efficiency less than 1.

However, if for example the grating period, grating depth and diffraction order are tripled, the grating will deflect green light into the $3^{rd}$ order by the same angle (as in the previous case of the grating operating at first diffraction order), and also the other two wavelengths of a white spectrum (red $\lambda_r = 3/2\ \lambda_g$ and blue $\lambda_b = 4/3\ \lambda_g$) will be deflected into the same angle although not at the same diffraction orders (i.e. red will be then operating at $2^{nd}$ and blue at $4^{th}$ diffraction orders). All three wavelengths will deflect with efficiency equal to 1 (i.e. with maximized efficiency).

It has to be stressed that the behaviour of diffractive structures is principally different from the behaviour of refractive structures. The simple blazed grating discussed above resembles an assembly of micro-prismatic structures. However, the grating can deflect the incident light in directions which are not the same as geometrical paths of light through the equivalent (i.e. the same triangular shape but on a different scale) prismatic feature, which follows the refractive principle. This is actually obvious, even from the grating equation (see above), which implies that incident light is deflected in multiple directions given by the structure of the diffraction orders. Moreover, the deflection into one of the directions of the diffraction orders, which may not be the same as the direction of the beam refracted through the refractive micro-prism of equivalent shape (i.e. a scaled up period of the blazed profile), can be significantly more efficient (or even maximized) than the deflection into the direction of refraction on the said refractive micro-prism (in this respect, see and compare the top and bottom examples in FIG. 5(b)). Therefore, the design of grating features cannot simply follow the rules of refraction. In other words, the diffraction grating (even a blazed grating with a profile in the shape of an assembly of micro-prismatic features) is not just a scaled down version of a refractive micro-prismatic (or other refractive) structure, if the efficiency of deflection into the direction of refraction should be maximized. Even in the case where both micro-prismatic and diffraction gratings have the same sizes of features, the behavior (i.e. the ability to deflect an incident beam into a certain direction) of a grating structure optimized on diffraction principles may be different from the behaviour of a micro-prismatic structure optimized on refractive principles.

There now follows an explanation of the relationship between operational diffraction orders and feature sizes, which again is to be understood as being for non-limiting explanatory purposes only for aiding an understanding of certain embodiments of the invention, so it should not be construed as limiting the scope of the invention to any particular theory or theoretical model or embodiment.

A different grating structure may be designed to operate at much higher diffraction orders, enabling more wavelengths to reach efficiency equal to 1. However, increasing the order of operation of the diffraction grating may result in an increase of the size of grating features, which will eventually turn the grating rather into a refractive micro-structure (i.e. refraction will "dominate" over the diffraction).

Figure 4A:
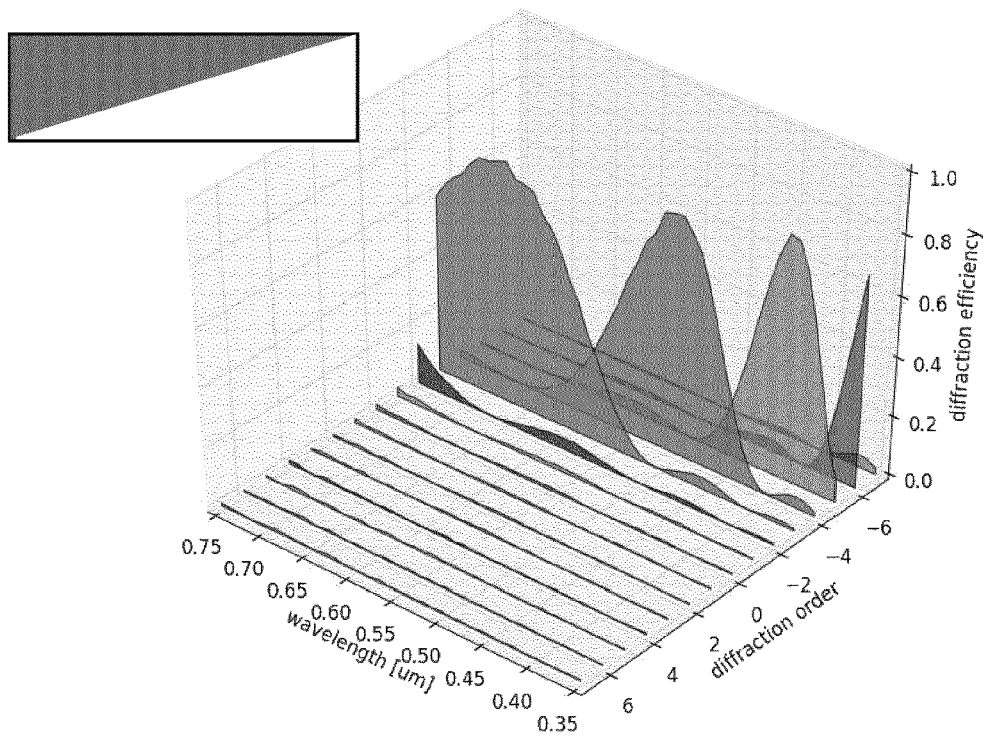
FIG. 4(a) is an explanatory graph illustrating the relationship between diffraction order and diffraction efficiency across the visible spectrum in relation to certain optical functions as may be employed in certain example embodiments of the invention, for aiding an understanding of, and to be read in conjunction with, the explanations hereinbelow concerning diffractive structures with multi-order (or plural-order) functionality(ies)

In order to keep grating features (i.e. their depth, in particular) reasonably small (i.e. less than about 15 µm, especially less than about 10 µm, optionally less than about 5 µm, or perhaps even less than about 3 µm) so that they may be moulded easily into the plastics foils we preferably utilize in embodiments of this invention, the present inventor(s) focused on a task to find the lowest operational diffraction order of the grating that would ensure sufficient suppression of colour effects. By using more rigorous methods of calculating diffraction efficiency (for example the RCWA method, which is often used by persons skilled in the art for this purpose) and by experimenting with prototype diffractive structures, we discovered that gratings and also more complex diffractive structures (e.g. which have designs based on grating-like structures) may produce sufficiently achromatic light distribution patterns if they operate at an average diffraction order as low as $3^{rd}$. For optimum results the structure did not typically have to operate at a higher average order than $6^{th}$—this is illustrated in FIG. 4(a) of the accompanying drawings. This FIG. 4(a) shows the diffraction efficiency of the visible spectrum at multiple (plural) diffraction orders for a blazed grating with a period of 10 µm and profile depth 3.5 µm (the profile representation is shown in FIG. 4(a) adjacent the top left corner thereof). As was mentioned above, only a few wavelengths reach optimum efficiency at a given diffraction order, and only these wavelengths are re-directed by the diffractive structure into the same direction. The other wavelengths are actually redirected into somewhat different directions. Using the equations above, grating parameters and the bandwidth of the efficiency curves on the graph of FIG. 4(a), the light of wavelengths within a half-width of the peak may actually be re-directed into a small cone of diffraction angles only several degrees wide (e.g. actually less than 5 degrees wide). Since those spectral peaks represent red, green and blue portions of the visible spectrum and they overlap spatially, they may produce a well achromatized diffraction pattern.

The modelled efficiency of peak wavelengths (i.e. distributed across the multiple orders) may be about 70%. The remaining energy is distributed among other lower or higher orders (i.e. not all of them are displayed on the graph of FIG. 4(a)). This may usually be considered as an undesirable effect, due to a decrease in the efficiency of the main optical function (as discussed in relation to the beam-splitting diffractive structure described above). However, we have unexpectedly discovered that mixing of high and low efficiency orders may contribute further to achromatization of the light distribution pattern at the exit of the diffractive structure.

The achromatization effect has been analyzed and illustrated here only by way of one example of a specific grating.

Figure 4B:
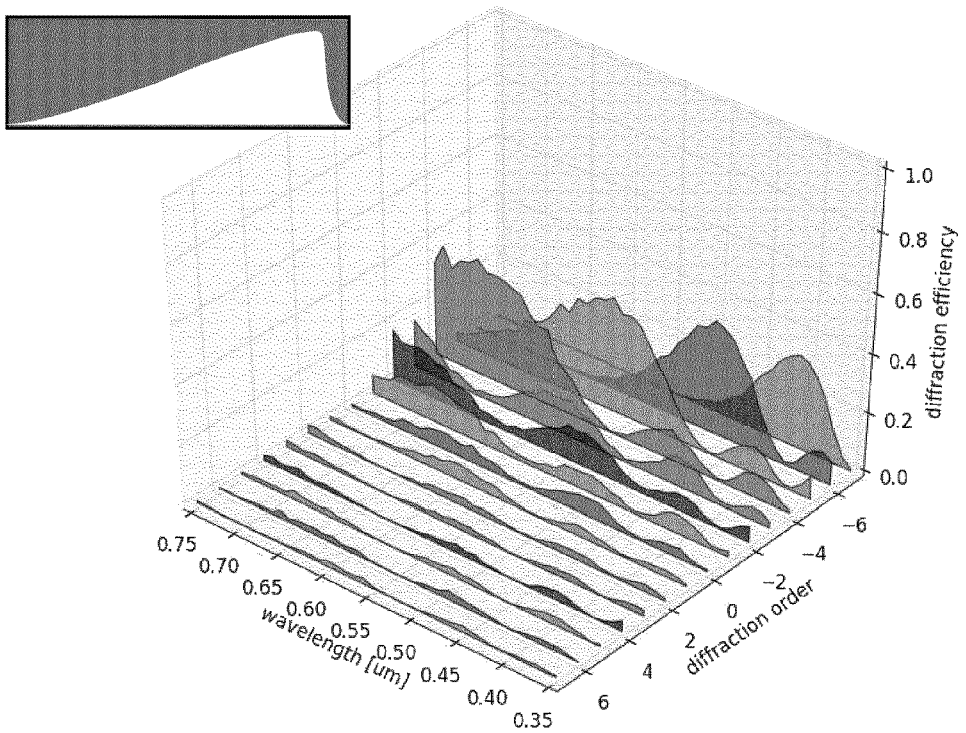
FIG. 4(b) is another explanatory graph, similar to FIG. 4(a), but illustrating the relationship between diffraction order and diffraction efficiency across the visible spectrum in relation to certain other optical functions as employed in certain other example embodiments of the invention, again for aiding an understanding thereof and to be read in conjunction with the explanations thereof hereinbelow.

However, a similar and/or reversed approach may be used by a designer not only for analysis but also for design of diffraction gratings or more complex diffractive structures which redistribute incident light into multiple directions, keeping the resulting light distribution curve achromatized. In reality the design problem may be even more complex owing to deviations from idealized structures (such as ideal blaze gratings), which may be caused by limitations in diffractive structure origination or replication processes. These deviations may manifest themselves as, for example, rounding of the sharp profile features, reduced angle of the side wall, surface roughness, etc. These deviations may also have a significant effect on the distribution of the diffraction efficiency at different orders—which is illustrated in FIG. 4(b) of the accompanying drawings. Therefore, also these deviations may have to be considered during the diffractive structure design stage.

However, we unexpectedly found that these imperfections and their effect on diffraction efficiency may contribute rather positively to smoothing out residual colour effects and also to suppressing or removing any undesirable sharp transitions or localized peaks in the light distribution or illumination patterns, which are often responsible for unacceptable glare at certain observation angles and/or inhomogeneity in the illumination pattern. This may actually often be a problem of conventional micro-structures, which need to be combined with additional "smoothing" elements (such as diffusers), while diffractive structures used in embodiments of the present invention may operate with a certain level of "smoothing" functionality inherently therein.

In practising some embodiments within the scope of the present invention, it may be advantageous to add one or more "smoothing" features to the diffractive structure of the relevant optical element(s). In the case or relief types of diffractive structures, such "smoothing" feature(s) may represent deviation(s) (i.e. typically in height) from the profile shape of the original diffractive structure. The size of such "smoothing" feature(s) may usually be smaller (e.g. at least about 2 times smaller) than the features of the original diffractive structure. In some cases the additive "smoothing" feature(s) may be included in the optical design of the function and structure of the diffractive structure, whereas in other cases it may be more practical to determine "smoothing" feature(s)' size and/or density and/or depth of modulation and/or type of distribution experimentally.

All the above-described discoveries have led us to a novel use of high-density nano- or micro-structures (i.e. nano- or micro-structures with typical feature sizes below 10 µm) for illumination applications in luminaires, which may be capable of operating at white light and multiple operational diffraction orders, typically higher than 1' and lower than $10^{th}$ or $15^{th}$ or $20^{th}$, and which may perform complex functions due to their ability to concentrate high numbers and diversities of nano- and micro-features, these features being typically of a low aspect ratio, thereby making these structures easily manufacturable in large volumes using cheap and very light carriers (e.g. plastics foils), and which can provide an achromatic and smooth appearance of a luminaire as well as light distribution or illumination patterns either with or without the aid of additional "smoothing" features.

We turn now to a description and discussion of various optional features of some further example embodiments of the invention, which involve the use of stacked or layered combinations of plural optically functional elements, layers or surfaces.

In certain embodiments of the invention a nano- or micro-structured substrate or surface or surface layer thereof performing a certain optical function may be replaced by two or more layers (i.e. substrates or surfaces or surface layers thereof) forming a stack of layers, each layer performing the optical function only partially, and the entire stack of layers performing the overall optical function fully, as per the original nano- or micro-structured layer or its close equivalent.

Although using a stack of layers instead of one layer may seem counterproductive, for example from the optics efficiency standpoint (since each layer introduces new boundaries on which the incident light may reflect back towards the source(s), which may further get absorbed or attenuated or redirected into undesirable directions) and/or the cost standpoint (since the use of more layers and their need for physical assembly may be more expensive), there may actually be advantageous in some embodiments of the present invention, given their attractiveness from a production standpoint. They may also be advantageous in that they may enable an optical function to be designed and exploited which may not be possible or may be difficult to achieve by using a known type of nano- or micro-structure which relies on a single layer configuration. Further, they may also be advantageous in that they may enhance a given pre-existing optical function of an originally single layer. In the end these potential additional benefits may even prove the plural-layer, stacked approach to be a cheaper solution in comparison with potential other alternatives.

A structure performing deflection of light incident perpendicularly to the layer surface into a higher angle may be used as an example to illustrate certain advantages of replacing a single nano- or micro-structured layer with a stack of layers. One example of this is illustrated in FIG. 5(a) of the accompanying drawings.

Figure 5A:
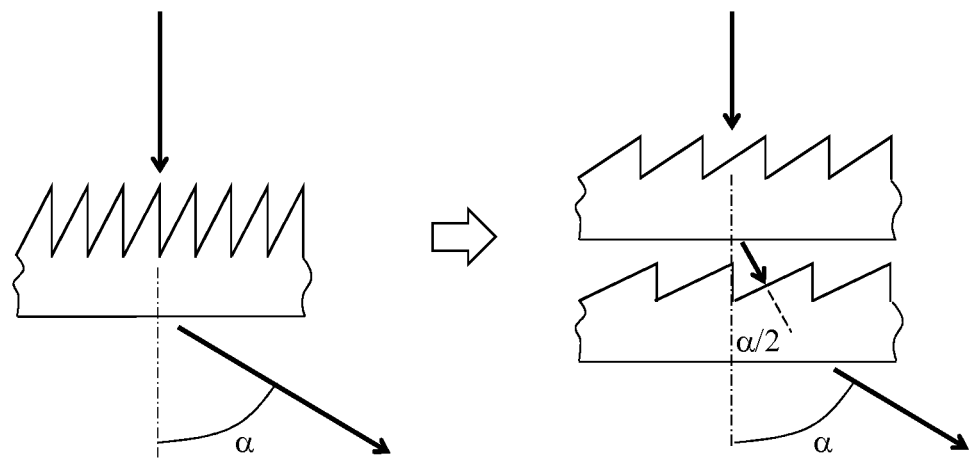
FIG. 5(a) is a schematic cross-sectional illustration representing an example optical element for use in certain embodiments of the invention in which stacked or layered combinations of plural optically functional elements, layers or surfaces are employed, this FIG. illustrating the basic principle of replacing a single layer with a stack of layers.

As shown in FIG. 5(a) (left-hand side), the deflection of incident light into certain angles may be performed in a basic manner for example by a diffractive structure in the form of e.g. a blazed diffraction grating. Considering normal incidence onto the grating surface, a person skilled in the art may design the grating period, the blazed profile angle and the preferred diffraction order for a given wavelength such that the grating deflects the incident beam by angle $\alpha$ (see FIG. 5(a). However, the resulting efficiency of such a grating may be low, and even optimization of the shape of the grating profile may not be able to increase the efficiency to a desirable level. Moreover, regardless of the diffraction efficiency, the structure may be difficult to produce or reproduce, owing to the high structure depth and/or high aspect ratio of the grating profile (see FIG. 5(a), left-hand side). However, by replacing such a grating structure with a stack of two grating structures in such a way that each grating performs partial deflection, for example at angle $\alpha/2$ (as shown in FIG. 5(a), right-hand side), they will be less dense and shallower than the original grating, and thus will be easier to produce and reproduce. In many cases the overall efficiency of the deflection by the stack will be higher than the efficiency of a single grating, in spite of additional reflections introduced by additional boundaries of the second grating. Also, since the production of the gratings in the stack is much easier, it may be even more cost-effective to produce and use two such layers with simpler grating structures, rather than using just one single layer with a grating structure that is more difficult to produce/reproduce.

In some embodiments the nano- or micro-structures in the stack of layers may be designed such that their structure is the same in all layers (although not necessarily the degree of their partial optical function), which may further reduce the cost of the mass production, including the production of the primary structure (i.e. the mould) as well as the multiplication (i.e. replication) process—especially since only one type of structure needs to be produced.

It may be at the designer's discretion to decide how the desired optical function may be split as between the multiple (i.e. plural) layers in the stack (i.e. how much of the optical function the structure of each layer performs), so that the entire stack performs the desired overall function as a whole.

In some embodiments the desired overall optical function may not be able to be produced by one layer only, but may be producible only by a stack of layers. An example of such an optical function which cannot be produced by a single layer configured in a certain way, but may be produced by a stack of the layers, is illustrated in FIG. 5(b), in which the top and bottom halves show two slightly different but closely related arrangements.

Figure 5B:
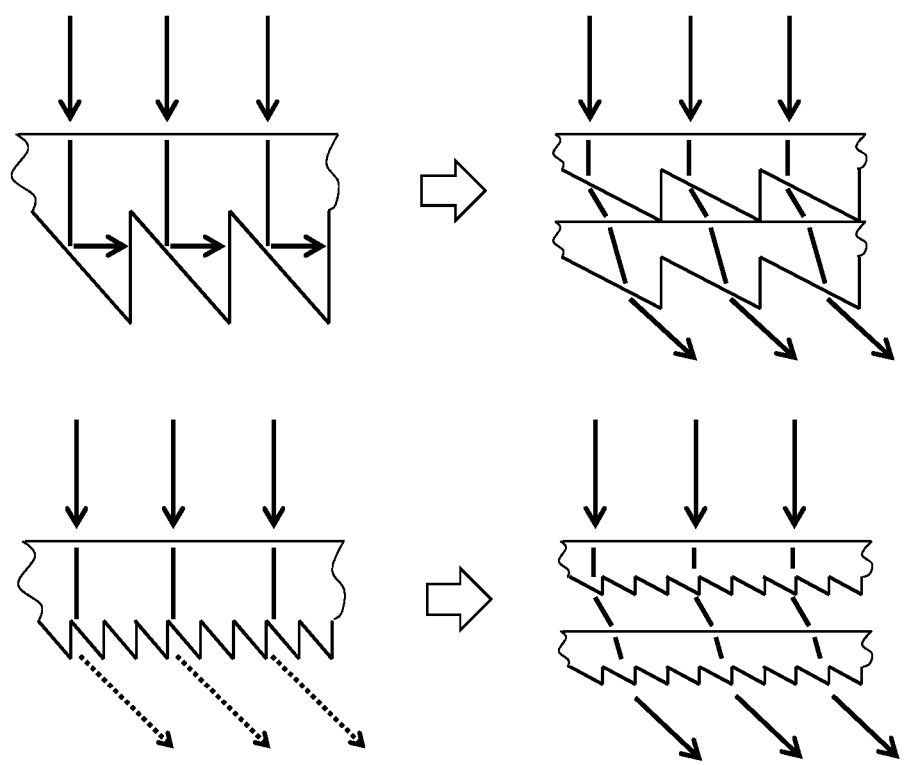

Referring to FIG. 5(b), top half: A micro-structure consisting of micro-prisms oriented away from the incident light can be used to deflect light (in a similar manner to a diffraction grating as shown in FIG. 5(a) (left-hand side). However, if one wishes to achieve large deflection angles (e.g. higher than ~45°, for a refractive index of the micro-prisms of ~1.5), the incident beam may get totally reflected from the prisms and would not exit the structure at the desired angle (see FIG. 5(b), top half, left-hand side). However, the prism structure may in principle be able to be configured to refract the incident beam into a higher angle, but such a beam may still get totally reflected on the opposite side of the layer, in which case this may not represent an optimum solution. In contrast, however, the stacked arrangement shown in FIG. 5(b), top half, right-hand side, does present a workable and useful solution.

In a similar arrangement, FIG. 5(b), bottom half, illustrates an optical function (i.e. deflection to higher angles) which, although it cannot be performed with high efficiency by one blazed diffraction grating only of a given orientation, can be performed efficiently by two stacked gratings of the same type and orientation, each performing a respective portion of the overall deflection, and in total they perform the desired total deflection, as FIG. 5(b), bottom half illustrates.

Figure 5C:
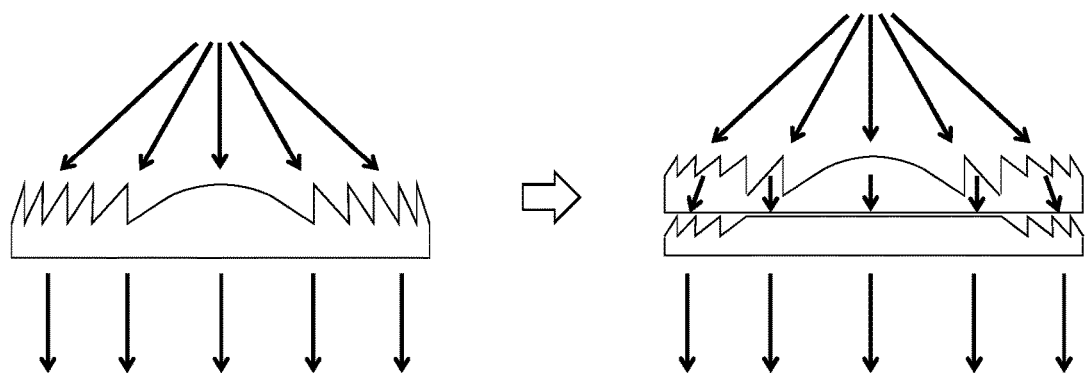
FIG. 5(c) is another schematic cross-sectional illustration representing an example optical element based on stacked or layered combinations of plural optically functional elements, layers or surfaces, this FIG. 5(c) illustrating the idea of splitting the optical function of the layer structure between multiple layers only on a portion of the original structure.

In other embodiments an optical function of only a portion of a nano- or micro-structure on one layer may be split into multiple nano- or micro-structures in a stack of layers. FIG. 5(c) shows an example of this—in which a collimating Fresnel lens is employed.

The zonal structure of such a lens becomes denser with increasing distance from the lens centre. The optical function of the denser areas of the lens is split between two lens structures on two layers. The central portion of the original lens is now part of the top layer only and the second layer does not contain any structure at the respective central area. The partial split of certain areas only, typically those which are difficult to produce, and the leaving of the less dense areas untouched, may be an advantageous approach, since it may reduce the total number of zones in the stack and therefore also a potential scatter which may typically be generated at the zone boundaries (i.e. at sharp transitions between the zones).

As already mentioned above, the optical function of the whole original layer or any of its portions may be split into two or more partial functions, each partial function being performed by a structure associated with a respective layer in the stack of layers replacing the original layer, with each such structure being designed to perform the partial function to a certain degree of the original function, and all partial functions being performed as per the original optical function or its close equivalent. In other words, the stack of layers redistributes the incident light into the same or similar light distribution pattern as would be produced by the structure of the original layer, unless the original structure alone cannot produce the desired light distribution pattern or cannot produce it with sufficient efficiency, and it can be produced per-partes by the structures associated with the layers in the stack.

In some embodiments, therefore, the optical functions associated with different portions of the original structure may be split into multiple layers in such a way that the respective portions of the structure in a given layer perform respective partial functions to different degrees for each portion, and in some instances this may be done differently for each layer in the stack.

Figure 5D:
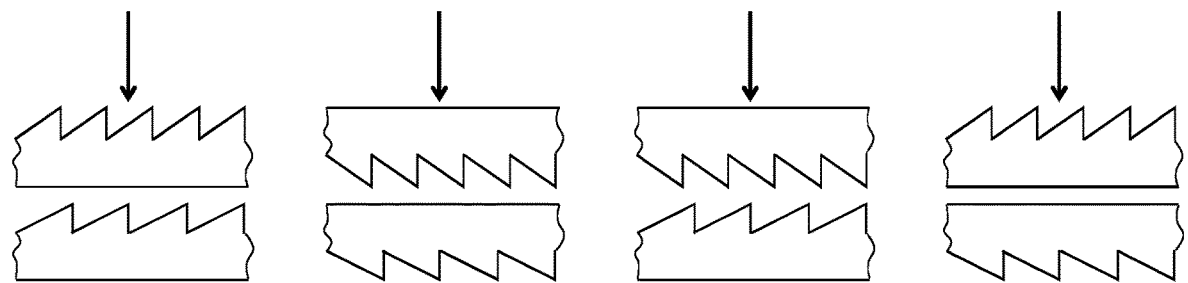
FIG. 5(d) is another schematic cross-sectional illustration representing an example optical element based on stacked or layered combinations of plural optically functional elements, layers or surfaces, this FIG. 5(d) illustrating some examples of different orientations of the structures in the stack of layers.

Since the structures performing optical functions in the stack of layers may be physically separated, the redistribution of the incident light may somewhat differ from the redistribution performed by a structure based on a single layer. Therefore, the optical function of the structures in the stack of layers may somewhat differ from the optical function of a structure based on a single layer. To make sure these functions are almost the same, any separation between the structures in the layers may need to be minimal and preferably should not exceed the thickness of one or two of the layers. This principle is illustrated in FIG. 5(d), right-hand side. Also, the lateral shift between a beam incident on a particular layer and the next one preferably should not exceed the separation distance between neighbouring structures in the stack. In most cases this may be easily achieved, since the layers are in any event very thin.

Figure 5E:
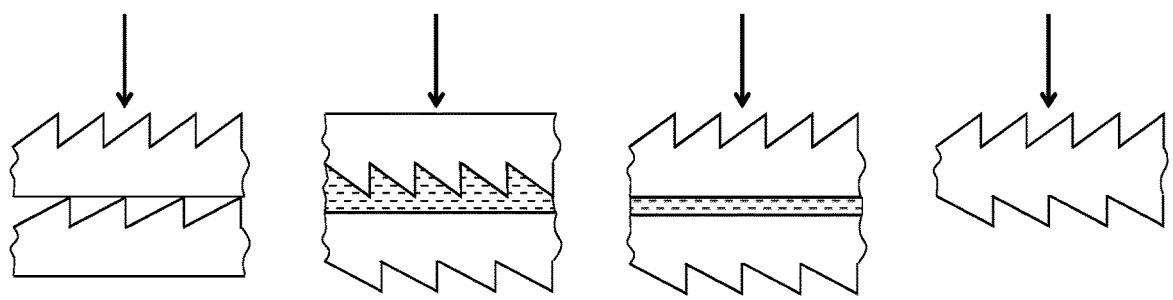
FIG. 5(e) is another schematic cross-sectional illustration representing an example optical element based on stacked or layered combinations of plural optically functional elements, layers or surfaces, this FIG. 5(e) illustrating some examples of different types of separation between layers in the stack of layers.

In such stacked-layer embodiments the configuration of the plural layers replacing the original layer may not be limited to the configurations exemplified in FIGS. 5(a), 5(b) and 5(c), i.e. in which the structure of the replacing layers has the same orientation as the original structure (i.e. towards the incident beam) and an air gap is left between the replacing layers. Many other configurations may be used as well—and FIGS. 5(d) and 5(e) illustrate that by way of a collection of additional example stack arrangements.

Throughout the description and claims of this specification, the words "comprise" and "contain" and linguistic variations of those words, for example "comprising" and "comprises", mean "including but not limited to", and are not intended to (and do not) exclude other moieties, additives, components, elements, integers or steps.

Throughout the description and claims of this specification, the singular encompasses the plural unless expressly stated otherwise or the context otherwise requires. In particular, where the indefinite article is used, the specification is to be understood as contemplating plurality as well as singularity, unless expressly stated otherwise or the context requires otherwise.

Throughout the description and claims of this specification, features, components, elements, integers, characteristics, properties, compounds, chemical moieties or groups described in conjunction with a particular aspect, embodiment or example of the invention are to be understood to be applicable to any other aspect, embodiment or example described herein unless incompatible therewith or expressly stated otherwise.

The invention claimed is:

1. A luminaire including:
   at least one light source for emitting visible light; and
   an optical system for directing and/or distributing the visible light emitted by the at least one light source into a desired visible output light distribution pattern,
   wherein the optical system comprises one or more optical elements, each of the one or more optical elements comprising a foil or sheet substrate having at least one optically functional surface or surface layer on at least a portion thereof;
   wherein the foil or sheet substrate of each of the one or more optical elements has a thickness and a lateral dimension, the thickness of the foil or sheet substrate is less than 1,000 μm and is at least 10 times less than the lateral dimension; and
   wherein:
   (i) at least a portion of the at least one optically functional surface or surface layer on the foil or sheet substrate of at least one of the one or more optical elements has a diffractive optical function, the diffractive optical function comprising a fully or partially diffractive optical function derived from or created by a diffractive optical relief structure or pattern formed on the at least one optically functional surface or surface layer, the diffractive optical relief structure or pattern comprising a plurality of surface relief features, each one of the surface relief features of the diffractive optical relief structure or pattern having a width, a height, and a depth,
   wherein:
   (ia) the width and/or the height of each one of the surface relief features is from 0.001 μm to 100 μm;
   (ib) the depth of each one of the surface relief features is less than 15 μm;
   (ic) each one of the surface relief features has an aspect ratio of less than 1; and
   (id) the diffractive optical relief structure or pattern has a density of placement of the surface relief features across an area of the at least one optically functional surface or surface layer, in at least one surface direction, from 50,000 or 20,000 surface relief features per mm to 20 or 50 surface relief features per mm; and
   (ii) at least a portion of at least one of the one or more optical elements is shaped such that at least a portion of the foil or sheet substrate is configured so as to have a non-flat or non-planar shape in three dimensions.

2. The luminaire according to claim 1, wherein the at least one of the one or more optical elements that is configured so as to have the non-flat or non-planar shape in three dimensions is one of the one or more optical element in which the at least one optically functional surface or surface layer has the diffractive optical function.

3. The luminaire according to claim 1, wherein:
   the optical system comprises a plurality of optical elements; and
   one of the plurality of optical elements that is configured so as to have the non-flat or non-planar shape in three dimensions is a different one of the one or more optical elements in which the at least one optically functional surface or surface layer has the diffractive optical function.

4. The luminaire according to claim 1, wherein
   the width and/or the height of at least one of the surface relief features of the diffractive optical relief structure or pattern is from 0.001 μm to 50 μm or 60 μm or 70 μm.

5. The luminaire according to claim 1, wherein the at least one of the one or more optical elements in which at least the portion of the foil or sheet substrate is shaped so as to be non-flat or non-planar in three dimensions is shaped to be non-flat or non-planar in three orthogonal dimensions, whereby a shape of the at least one of the one or more optical elements is curved or arcuate in cross-section or profile, or follows a simple or complex mathematical function, or is defined as a free-form optical surface, in at least one, or two, or three orthogonal dimensions.

6. The luminaire according to claim 1, wherein:
   the at least one optically functional surface or surfaces layer on the foil or sheet substrate of the at least one of the one or more optical elements has formed thereon or applied thereto one or more coating layers; and
   the one or more coating layers being constructed or configured or formed of a material so as to modify, or further modify, a direction of the visible light passing therethrough or to modify visible light transmission and/or reflection properties of the at least one optically functional surface or surface layer on or to which the one or more coating layers is formed or applied.

7. The luminaire according to claim 1, wherein the foil or sheet substrate of the one or more optical elements comprises an optically transparent plastics material or combination of plastics materials.

8. The luminaire according to claim 1, wherein:
   the diffractive optical relief structure or pattern operates at plural or multiple diffraction orders lower than 10th or 15th or 20th; and
   the diffractive optical function of the diffractive optical relief structure or pattern is such that it operates at at least two or at least three or at least four diffraction orders having diffraction efficiency maximized at at least two or at least three or at least four wavelengths respectively.

9. The luminaire according to claim 1, wherein a structure and/or configuration of the at least one of the one or more optical elements, in which at least a portion of the foil or sheet substrate has the diffractive optical relief structure or pattern thereon, is such that visible light emitted by the at least one light source of at least two different wavelengths, which is incident on the diffractive optical relief structure or pattern at the same angle of incidence, is directed or distributed thereby into substantially overlapping directions with maximized diffraction efficiency, relative to the diffraction efficiency of the visible light being directed or redistributed into other directions.

10. The luminaire according to claim 1, wherein the diffractive optical function of the diffractive optical relief structure or pattern is such that plural or multiple wavelengths of the visible light with maximized diffraction efficiency are distributed across at least 60% of the bandwidth of the visible light emitted by the at least one light source.

11. The luminaire according to claim 1, wherein
   the at least one optically functional surface or surface layer of the at least one of the one or more optical elements comprises:

a substantially reflective surface or surface layer, comprising a metal film coating or layer, or one or more dielectric materials, or a total internal reflection surface or surface layer; or a substantially optically transparent surface or surface layer.

12. The luminaire according to claim 1, wherein the diffractive optical relief structure or pattern comprises
one or more structural features having a first density superimposed on one or more structural features with a second density,
wherein:
the first density is higher than the second density, and
relatively higher density structural features have a width and/or a height that is at least two times, or at least five times, or at least ten times smaller than a corresponding size of relatively lower density structural features.

13. The luminaire according to claim 1, wherein the at least one of the one or more optical elements comprises a stack or superimposed or overlapping combination of a plurality of discrete substrate foils or sheets or surfaces or surface layers,
wherein:
in the combination of the plurality of discrete substrate foils or sheets or surfaces or surface layers, each one of the plurality of discrete substrate foils or sheets or surfaces or surface layers performs a portion of an overall optical function of a respective one of the one or more optical elements and an entirety of the plurality of discrete substrate foils or sheets or surfaces or surface layers performs the overall optical function of the respective one of the one or more optical elements; and
in the combination, any separation between the plurality of discrete substrate foils or sheets or surfaces or surface layers is such that a separation distance does not exceed a thickness of one or two of the plurality of discrete substrate foils or sheets or surfaces or surface layers, or a lateral shift between a beam incident on a given one of the plurality of discrete substrate foils or sheets or surfaces or surface layers and a next one is such that the lateral shift does not exceed the separation distance between neighboring ones of the plurality of discrete substrate foils or sheets or surfaces or surface layers.

14. The luminaire according to claim 1, wherein the optical system further comprises one or more secondary optical elements,
wherein:
the one or more secondary optical elements act to further define or distribute or modify or redistribute at least one direction of the visible light from the at least one light source incident thereon and thereby to contribute to formation of the visible output light distribution pattern at an exit of the luminaire;
the one or more secondary optical elements are arranged:
separately or discretely within the luminaire, and spaced apart from, and/or oriented parallel or non-parallel to a respective one of the one or more optical elements having the at least one optically functional surface or surface layer thereon; or
superimposed on, or overlapped with, or placed facially adjacent to a respective one of the one or more optical elements having the at least one optically functional surface or surface layer thereon.

15. An optical system for a luminaire, the optical system being for directing and/or distributing visible light emitted by at least one light source into a desired visible output light distribution pattern, wherein the optical system comprises:
a plurality of optically-functional optical elements, wherein:
at least one of the plurality of optically-functional optical elements comprises (i) of claim 1; and
at least another one of the plurality of optically-functional optical elements comprises (ii) of claim 1.

16. An optical system for a luminaire, the optical system comprising being for directing and/or distributing visible light emitted by at least one light source into a desired visible output light distribution pattern, wherein the optical system comprises:
at least one optically-functional optical element that comprises both (i) and (ii) of claim 1; or
at least one optically-functional optical element in which at least one first portion or region of the at least one optically-functional optical element comprises (i) of claim 1 and at least one second portion or region of the at least one optically-functional optical element comprises (ii) of claim 1,
wherein:
the first and second portions or regions of the at least one optically-functional optical element are formed by discrete and different ones of plural portions of the at least one optically-functional optical element;
the first and second portions or regions of the at least one optically-functional optical element are formed with their respective substrates at least partially in common with, or unitary with, one another; and
the at least one first portion or region being a non-flat or non-planar optically-functional optical element portion or region of the at least one optically-functional optical element is configured such as to surround or enclose or circumscribe or peripherally contain the at least one second portion or region being a diffractively-optically-functional optical element portion or region.

17. A method for producing an optical element for an optical system of a luminaire, the optical system being for directing and/or distributing visible light emitted by at least one light source of the luminaire into a desired visible output light distribution pattern,
wherein the method comprises the steps of:
(1) providing a foil or sheet substrate, wherein a thickness of the foil or sheet substrate is less than 1,000 μm and is at least 10 times less than a lateral dimension of the foil or sheet substrate;
(2) forming on or applying to at least a portion of at least one surface or surface layer of the foil or sheet substrate a diffractive optical function, wherein:
the diffractive optical function comprises a fully or partially diffractive optical function derived from or created by a diffractive optical relief structure or pattern formed on the at least the portion of the at least one surface or surface layer;
a width and/or a height of each one of a plurality of surface relief features of the diffractive optical relief structure or pattern is from 0.001 μm to 100 μm;
a depth of each one of the surface relief features is less than 15 μm;

an aspect ratio of each one of the surface relief features is less than 1; and a density of placement of the surface relief features across an area of the at least one surface or surface layer, in at least one surface direction, is from 50,000 or 20,000 surface relief features per mm to 20 or 50 surface relief features per mm; and (3) shaping the foil or sheet substrate so that at least a portion of it assumes or is configured into the a non-flat or non-planar shape in three dimensions.

18. The method according to claim 17, wherein:

(i) the step of (3) shaping is carried out either before or after the step of (2) forming the diffractive optical function; or (ii) the step of (2) forming the diffractive optical function is carried out either before or after the step of (3) shaping; or (iii) the step of (2) forming the diffractive optical function and the step of (3) shaping are carried out together or substantially simultaneously.

19. The method according to claim 17, further including an additional step of:

(4) forming on or applying to at least one diffractively optically functionalized surface or surface layer one or more coating layers, each coating layer being constructed or configured or formed of a material so as to modify the direction of the visible light passing therethrough or to modify the visible light transmission and/or reflection properties of the at least one diffractively optically functionalized surface on or to which the coating layer is formed or applied;

wherein:

(i) the step of (4) forming is carried out either before or after the step of (2) forming the diffractive optical function; and/or (ii) the step of (4) forming is carried out either before or after the step of (3) shaping.

20. The luminaire according to claim 4, wherein the width and/or the height of at least one of the surface relief features of the diffractive optical relief structure or pattern is from 0.005 µm or 0.01 µm to 5 µm or 10 µm or 20 µm or 30 µm or 40 µm or 50 µm.

21. The luminaire according to claim 1, wherein the depth of each one of the surface relief features is less than 10 µm.

22. The luminaire according to claim 21, wherein the depth of each one of the surface relief features is less than 5 µm.

* * * * *